Figure 1:
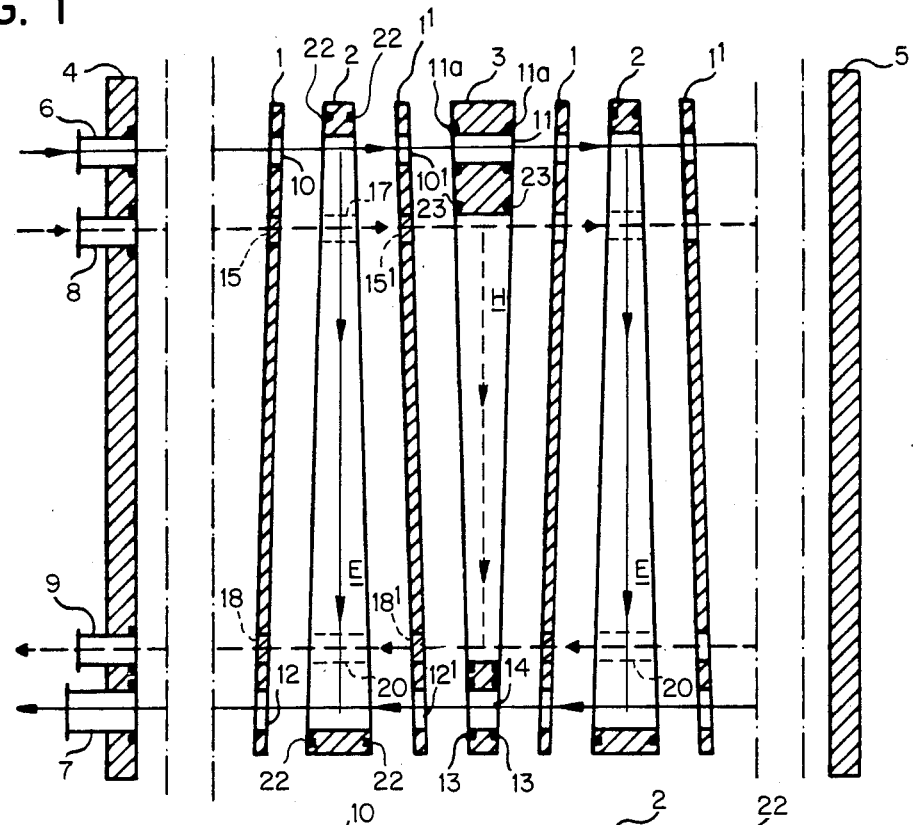

United States Patent [19]

Hallstrom et al.

[11] Patent Number: 4,762,171
[45] Date of Patent: Aug. 9, 1988

[54] PLATE TYPE EVAPORATOR

[75] Inventors: Bengt Hallstrom, Lund; Olle Olsson, Astorp; Ulf Bolmstedt, Staffanstorp; Bjorn-Olow Johansson, Lomma, all of Sweden

[73] Assignee: Alfa-Laval AB, Tumba, Sweden

[21] Appl. No.: 329,573

[22] Filed: Dec. 10, 1981

Related U.S. Application Data

[63] Continuation-in-part of Ser. No. 328,662, Dec. 8, 1981, abandoned.

[30] Foreign Application Priority Data

Dec. 8, 1980 [SE] Sweden .............................. 80085954

[51] Int. Cl.[4] .......................... F28F 13/08; F28F 3/08; B01D 1/22
[52] U.S. Cl. .................................... 165/147; 165/167; 165/166
[58] Field of Search ................ 165/174, 166, 167, 147

[56] References Cited

U.S. PATENT DOCUMENTS

| 8,487 | 11/1851 | Ingalls | 165/166 |
|---|---|---|---|
| 1,689,927 | 10/1928 | Newhouse | 165/174 |
| 2,872,165 | 2/1959 | Wennerberg | 165/147 |
| 3,117,624 | 1/1964 | Wennerberg | 165/167 |
| 3,175,962 | 3/1965 | Holtslag | 165/147 |
| 3,412,777 | 11/1968 | Donell et al. | 165/166 |
| 3,724,523 | 4/1973 | Mattern | 165/147 |
| 4,301,864 | 11/1981 | Kivikas et al. | 165/174 |

FOREIGN PATENT DOCUMENTS 0132411 3/1948 Sweden .............................. 165/166

Primary Examiner—Albert W. Davis, Jr.
Assistant Examiner—John K. Ford
Attorney, Agent, or Firm—Cyrus S. Hapgood

[57] ABSTRACT

A plate evaporator comprises several heat exchange plates arranged substantially vertically in spaced face-to-face relationship to define between the plates evaporation passages alternating with heating medium passages. An increasing cross-sectional area and a decreasing perimeter of the evaporation passages are achieved by so arranging the two heat transfer surfaces of adjacent plates defining an evaporation passage that they diverge from each other in the flow direction of the medium to be evaporated and by decreasing the width of said heat transfer surfaces in said direction.

3 Claims, 1 Drawing Sheet

PLATE TYPE EVAPORATOR

This application is a continuation-in-part of application Ser. No. 328,662 filed 12/8/81, abandoned.

The present invention relates to an evaporator of the plate heat exchanger type comprising several heat exchanger plates essentially vertically arranged in spaced face-to-face relationship to define flow spaces between the plates for liquid to be evaporated and for heating medium.

In evaporators of the falling film type as well as the rising film type, liquid films are forced to move along essentially vertical heat transfer walls with the generated steam between the film surfaces in the evaporation passages. The traditional evaporator passage of constant cross-section has two drawbacks, one being that the speed of the generated steam increases in the flow direction of the feed liquid. The other is that the perimeter wetted by the liquid is constant in said direction. These features result in thinning of the liquid film along the heating surfaces; and in case of a low feed flow, they lead to film disruption and dry boiling. In practice, this problem is often solved by overloading on the product side, which means maintaining an unnecessarily thick film along a larger part of the heating surfaces giving low heat transfer values and requiring long heating surfaces. Also, if for a heat sensible product the problem is solved by recirculation, a lower product quality is obtained due to a long residence time.

For the above mentioned reasons, an ideal evaporator passage should have a decreasing perimeter and increasing cross-section in the flow direction.

The requirement of a gradually increasing cross-section of the evaporator passages has been realized and effected in prior devices of the plate type as well as the tube type.

In U.S. Pat. No. 2,117,337, which relates to a tube evaporator, a circular evaporator channel is provided with an internal conical body for heating steam, whereby expanding evaporator channels and also decreasing wetted perimeter with respect to the internal heat transfer surface are obtained. Along the external heat transfer surface, however, the wetted perimeter is constant. Swedish Patent No. 219,561 discloses a special evaporator in which the two desired features of decreasing wetted perimeter and increasing cross-section of the evaporation passages are met in the form of channels between two conical plate elements with different cone angles.

For plate heat exchangers, several ways to achieve increasing cross-section of the flow passages have been suggested. British Patent No. 788,193 shows heat exchanger plates provided with horizontally extended corrugations and increasing evaporation channel cross-section in the flow direction is achieved by successively changing the angle of said corrugations in said direction. However, the desired reduction of the wetted perimeter in the flow direction is not obtained in this way. British Patent No. 859,876 discloses an evaporator in which the liquid to be evaporated is first forced upwards between one pair of plates and then downwards between another pair of plates. One suggestion to achieve increased channel cross-section in this evaporator is to locate the last mentioned pair of plates at a larger distance from each other than the distance between the first mentioned pair of plates. Another suggestion is to use a larger number of plate interspaces for the downward flow than for the upward flow. Further, it is suggested to divide the flow passages for the feed liquid in an upwardly and downwardly diverging part and to force the liquid first to stream upwards in the upwardly diverging part of a plate interspace and then to stream downwards in the downwardly diverging part of another plate interspace. In fact, a gradually increasing cross-section of the evaporator channel is thereby obtained, although the perimeter even increases in the flow direction.

To be a realistic alternative from the economical point of view, an evaporator in which the two above-mentioned desired features are combined must not be too complicated to manufacture. Particularly if pressed plates are used, the press pattern must be designed so that reasonable press matrix costs and a minimal number of press patterns or plate embodiments are obtained. Further, to facilitate cleaning of the evaporation surfaces and to avoid operational disturbances due to clogging of the evaporation channels, a simple channel design is required.

The principal object of the present invention is to provide an evaporator of the plate type having the two desired features mentioned above and which meets the above-mentioned requirements of a simple channel design and safe operation.

A plate evaporator made according to the invention is characterized mainly in that the two plates of each adjacent pair defining an evaporation passage have respective heat exchange surfaces which diverge from each other in the direction of flow through such passage, so that the passage has a cross-sectional area which increases in the flow direction, and the width of each of the two heat exchange surfaces decreases in the flow direction to provide the evaporation passage with a perimeter at a given cross-section through the evaporation passage which decreases in said direction.

In an advantageous embodiment of the invention, the two plates of each adjacent pair defining an evaporation passages are spaced from each other by a frame configurated to maintain the two plates in diverging relationship in the flow direction through the passage. Also, the spacer frame is preferably provided with gasket means to delineate the respective heat exchange surfaces with their decreasing widths mentioned above.

Figure 2:
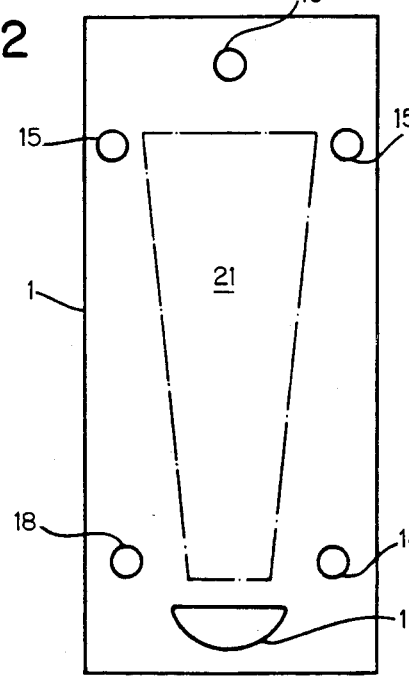
Figure 3:
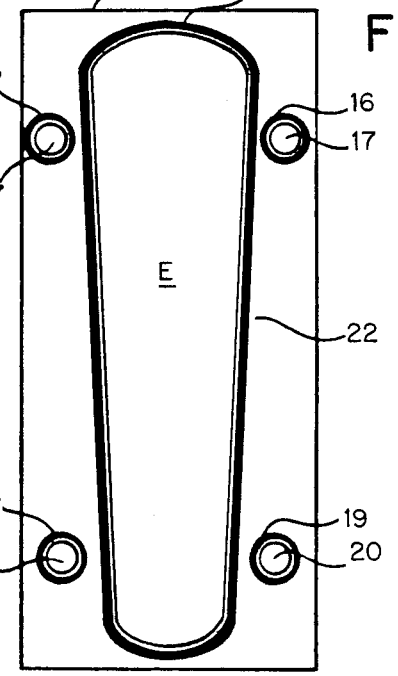

The invention will now be further described in connection with an embodiment of a plate evaporator of the falling film type and with reference to the accompanying drawing, in which FIG. 1 is an exploded sectional view of evaporator elements of a plate pack, the section being taken along the longitudinal center lines of the respective elements, and FIGS. 2 and 3 are elevational views of a plate element and a spacer frame, respectively, shown in FIG. 1.

As illustrated, the evaporator comprises a plate pack having a series of heat exchange plates 1 and 1' arranged between alternating spacer frames 2 and 3, thereby forming evaporation passages E alternating with passages H for a heating medium. The pack also has end wall elements 4 and 5, the end wall 4 being provided with an inlet 6 in its upper part for the product to be evaporated, an outlet 7 in its lower part for the evaporated product and generated steam, and an inlet 8 and outlet 9 for the heating medium.

It will be understood that the parts 1, 1' and 2-5 are clamped together by conventional means (not shown) to form the plate pack.

The product flow fed to the evaporator flows in the different evaporator passages E through apertures 10 and 10' in the plates 1 and 1' and passages 11 in the spacer frames 3, which passages are sealed from the heating medium passages H by means of gaskets 11a. Evaporated product and generated secondary steam flow in the lower part of the evaporator towards the outlet 7 through apertures 12 and 12' in the plates 1 and 1' and corresponding passages 14 sealed by gaskets 13 in the spacer frames 3. Heating medium fed through the inlet port 8 flows through apertures 15 and 15' in the plates 1 and 1' and the corresponding passages 17 provided with gaskets 16 in the spacer frames 2 into the heating medium passages H and then flows towards the outlet 9 through apertures 18 and 18' in the plates 1 and 1' and the corresponding passages 20 provided with the gaskets 19 in the spacer frames 2.

The plates 1 and 1' are provided with heat transfer surfaces 21 exhibiting decreasing width in the flow direction of the falling film. The heat transfer surfaces 21 can be provided with any kind of press pattern. The evaporation passages E encompassed by two adjacent heat transfer surfaces are sealed from the surroundings by means of an annular gasket 22 in the spacer frames 2.

The above-described embodiment is selected to exemplify the invention in principle. The function of the spacer frames may, of course, be included as an integrated part of the plate themselves, in which gasket grooves are pressed in a well known manner. The mutual divergence between the two heat exchange surfaces in such a case can be achieved by pressing out the two plate surfaces more and more towards each other in the direction towards the inlet end of the plates. Further, it is not necessary to feed or discharge all the flows through ports located inside the periphery of the plates. For example, the plate pack can be surrounded by a cover for product steam, and the plates can be designed to allow free product discharge at the lower end of the plate pack. This has the advantage that the entire length of the plates can be used for heat exchange.

The invention also includes such plate evaporators in which a pair of heat exchange plates are joined together by any sealing arrangement, such as welding, around the periphery of the plates to form closed spaces for product or heating medium. The product can be introduced into said spaces or forced to stream outside said spaces by means of any feed distribution system.

In FIG. 1, the path of the product to be evaporated and the evaporated product with generated steam is shown in full lines with arrows indicating the flow direction; and the path of the heating medium is shown in broken lines with arrows indicating the flow direction. As shown in FIGS. 2 and 3, apertures 15, 17, 18 and 20 are located adjacent the longitudinal side edges of elements 1 and 2 so that they are displaced from the longitudinal center lines on which the section in FIG. 1 is taken. Therefore, those apertures appear only in broken lines in FIG. 1.

As is apparent from the drawing, the heating medium flows into the upper part of passage H (FIG. 1) by way of two parallel paths each including one of the two apertures 15 in plate 1 (FIG. 2), a corresponding one of the two apertures 17 in spacer frame 2 (FIG. 3) and a corresponding aperture $15^1$ in plate $1^1$ (FIG. 1). Thus, the two streams of heating medium enter passage H adjacent opposite side edges thereof. Similarly, two streams of the heating medium discharge from the lower part of passage H, adjacent opposite side edges thereof, into respective flow paths each including one of the two apertures $18^1$ in plate $1^1$, a corresponding one of the two apertures 20 in spacer frame 2 and a corresponding one of the two apertures 18 in plate 1. Of course, the inlet and outlet ports 8-9 for the heating medium as shown in FIG. 1 are located adjacent one side edge of wall 4 so as to serve a corresponding one of the two parallel flow paths, and a second set of these inlet and outlet ports (not shown) are located adjacent the opposite side edge of wall 4 to serve the other of the two parallel flow paths.

Spacer frame 3 has gaskets 23 for sealing against adjacent plates 1 and $1^1$ to define passage H.

As previously mentioned, the width of each of the two heat exchange surfaces defining a passage E decreases in the flow direction to provide the passage with a perimeter which decreases in said direction. In other words, the outer boundary of passage E, as viewed in the flow direction, decreases progressively in length as the flow proceeds through it. The reason for this is that although the passage's cross-sectional area increases in the flow direction due to the downwardly diverging plates 1 and $1^1$ (FIG. 1), the decrease in the passage's width, as shown at 22 in FIG. 3, is sufficient so that the perimeter of the passage at its lowermost part is shorter that its perimeter at its uppermost part.

We claim:

1. A plate evaporator of the rising and/or falling film type comprising a series of heat exchange plates disposed substantially vertically in spaced face-to-face relationship to define evaporation passages through which a medium to be evaporated is adapted to pass in a flow direction, said plates also defining heating medium passages alternating with said evaporation passages, each plate having a part operable to conduct heat from a heating medium passage to an adjacent evaporation passage, each evaporation passage having an inlet end portion and an output end portion, the two plates of each pair of adjacent plates defining an evaporation passage having respective heat exchange surfaces which diverge from each other in said flow direction, thereby providing the evaporation passage with a cross-sectional area which increases in said direction, the width of each of said heat exchange surfaces decreasing from a relatively large width at said inlet end portion to a relatively small width at said outlet end portion of the evaporation passage, to provide the evaporation passage with a perimeter at a given cross-section through the evaporation passage which decreases from its inlet to its outlet end portion.

2. The evaporator of claim 1, comprising also a frame spacing said two plates from each other and configurated to maintain said two plates in diverging relationship in said flow direction.

3. The evaporator of claim 2, comprising also gasket means on said frame for delineating said heat exchange surfaces.

* * * * *